(12) United States Patent
Matsushita et al.

(10) Patent No.: US 11,921,974 B2
(45) Date of Patent: Mar. 5, 2024

(54) ICON DISPLAY CONTROLLING DEVICE AND ICON DISPLAY CONTROLLING PROGRAM

(71) Applicant: Faurecia Clarion Electronics Co., Ltd., Saitama (JP)

(72) Inventors: Yuki Matsushita, Saitama (JP); Azusa Shiina, Saitama (JP); Jun Sakura, Saitama (JP)

(73) Assignee: FAURECIA CLARION ELECTRONICS CO., LTD., Saitama (JP)

( * ) Notice: Subject to any disclaimer, the term of this patent is extended or adjusted under 35 U.S.C. 154(b) by 0 days.

(21) Appl. No.: 17/976,429

(22) Filed: Oct. 28, 2022

(65) Prior Publication Data

US 2023/0135063 A1  May 4, 2023

(30) Foreign Application Priority Data

Oct. 29, 2021  (JP) ................. 2021-178168

(51) Int. Cl.
*G06F 3/04817* (2022.01)
*G06F 3/0484* (2022.01)
*G06F 3/04886* (2022.01)

(52) U.S. Cl.
CPC ........ *G06F 3/04817* (2013.01); *G06F 3/0484* (2013.01); *G06F 3/04886* (2013.01)

(58) Field of Classification Search
CPC . G06F 3/04817; G06F 3/0484; G06F 3/04886
See application file for complete search history.

(56) References Cited

U.S. PATENT DOCUMENTS

| 2009/0315867 | A1* | 12/2009 | Sakamoto | ........... G06F 3/03547 345/184 |
| 2010/0313166 | A1* | 12/2010 | Nakayama | .......... G06F 3/04817 715/848 |
| 2016/0092050 | A1* | 3/2016 | Dos Santos | ........... G06F 3/0488 715/822 |
| 2016/0139907 | A1 | 5/2016 | Kumano et al. | |

(Continued)

FOREIGN PATENT DOCUMENTS

| JP | 2009-522666 A | 6/2009 |
| JP | 2015-026961 A | 2/2015 |
| WO | WO-2007/094894 A2 | 8/2007 |

OTHER PUBLICATIONS

Unpublished JP Application No. 2021-178169 filed Oct. 29, 2021, with English translation.

(Continued)

*Primary Examiner* — Mong-Shune Chung
(74) *Attorney, Agent, or Firm* — FOLEY & LARDNER LLP

(57) ABSTRACT

An icon display controlling device includes an area displaying unit for causing a display to display a first display area within which an icon can be placed; a deleting mode switching unit for switching to a deleting mode that enables deletion of a second icon that has already been placed in the first display area, in response to performance of a predetermined operation for placing a first icon in the first display area; and an icon positioning unit for placing the first icon in the first display area upon deletion of the second icon in the deleting mode.

17 Claims, 9 Drawing Sheets

(56) References Cited

U.S. PATENT DOCUMENTS

| 2017/0123645 A1* | 5/2017 | Xu ............................ G06F 9/44 |
| 2019/0243518 A1* | 8/2019 | Li ........................ G06F 9/44505 |
| 2021/0286510 A1* | 9/2021 | Tyler ................... G06F 3/04883 |

OTHER PUBLICATIONS

Unpublished JP Application No. 2021-193788 filed Nov. 30, 2021, with English translation.

* cited by examiner

ICON DISPLAY CONTROLLING DEVICE AND ICON DISPLAY CONTROLLING PROGRAM

CROSS-REFERENCE TO RELATED PATENT APPLICATION

This application claims the benefit of and priority to Japanese Patent Application No. 2021-178168, filed on Oct. 29, 2021, the entire disclosure of which is hereby incorporated by reference herein.

FIELD OF TECHNOLOGY

The present disclosure relates to an icon display controlling device and icon display controlling program.

BACKGROUND

There are known icon display controlling devices for controlling the display of icons. A specific structure for this type of icon display controlling device is disclosed in, for example, Japanese Patent Application Publication No. 2015-26961 ("Patent Document 1").

In the icon display controlling device according to Patent Document 1, when an icon for an application that is to be deleted is touched when in a deleting mode, deletion candidate applications related to this application are extracted, and the extracted deletion candidate applications are deleted together with the application that is the deletion object.

SUMMARY

With the icon display controlling device that is shown as an example in Patent Document 1, the size of the display area for displaying icons is limited. Because of this, the number of icons that can be displayed on a single screen is also limited. If the number of icons displayed in the display area reaches an upper limit, it will not be possible to add, in that state, a new icon to be displayed in the display area. The user must, for example, delete an icon that is displayed, to thereby make space to display the new icon.

In this case, the user must perform an operation for switching to the deleting mode, an operation for deleting the icon, an operation for switching to the registering mode, an operation for registering the new icon, and the like. The need for such complex operations causes a problem with poor usability.

In contemplation of the situation described above, an object of the present disclosure is to provide an icon display controlling device and icon display controlling program able to improve the ease of operations when deleting an icon that is displayed in a display area and placing another icon.

An icon display controlling device according to one aspect of the present disclosure comprises: an area displaying unit for displaying a first display area wherein an icon can be placed; a deleting mode switching unit for switching to a deleting mode that enables deletion of a second icon that has already been placed in the first display area, upon performance of a predetermined operation for placing a first icon in the first display area; and an icon positioning unit for placing the first icon in the first display area upon deletion of the second icon in the deleting mode.

The icon display controlling device and icon display controlling program according to one embodiment according to the present disclosure enable an improvement in the ease of operations when deleting an icon that is displayed in a display area and placing another icon.

BRIEF DESCRIPTIONS OF THE FIGURES

DETAILED DESCRIPTION

An icon display controlling device and icon display controlling program according to one embodiment will be explained below.

The icon display controlling device according to one embodiment is a vehicle-mounted device for car audio, a navigation device, or the like. Note that the icon display controlling device is not limited to a vehicle-mounted device, but instead may be a device of another form, such as a smart phone, a feature phone, a tablet terminal, a Personal Computer (PC), a Personal Digital Assistant (PDA), a Portable Navigation Device (PND), a portable game machine, or the like.

Figure 1:
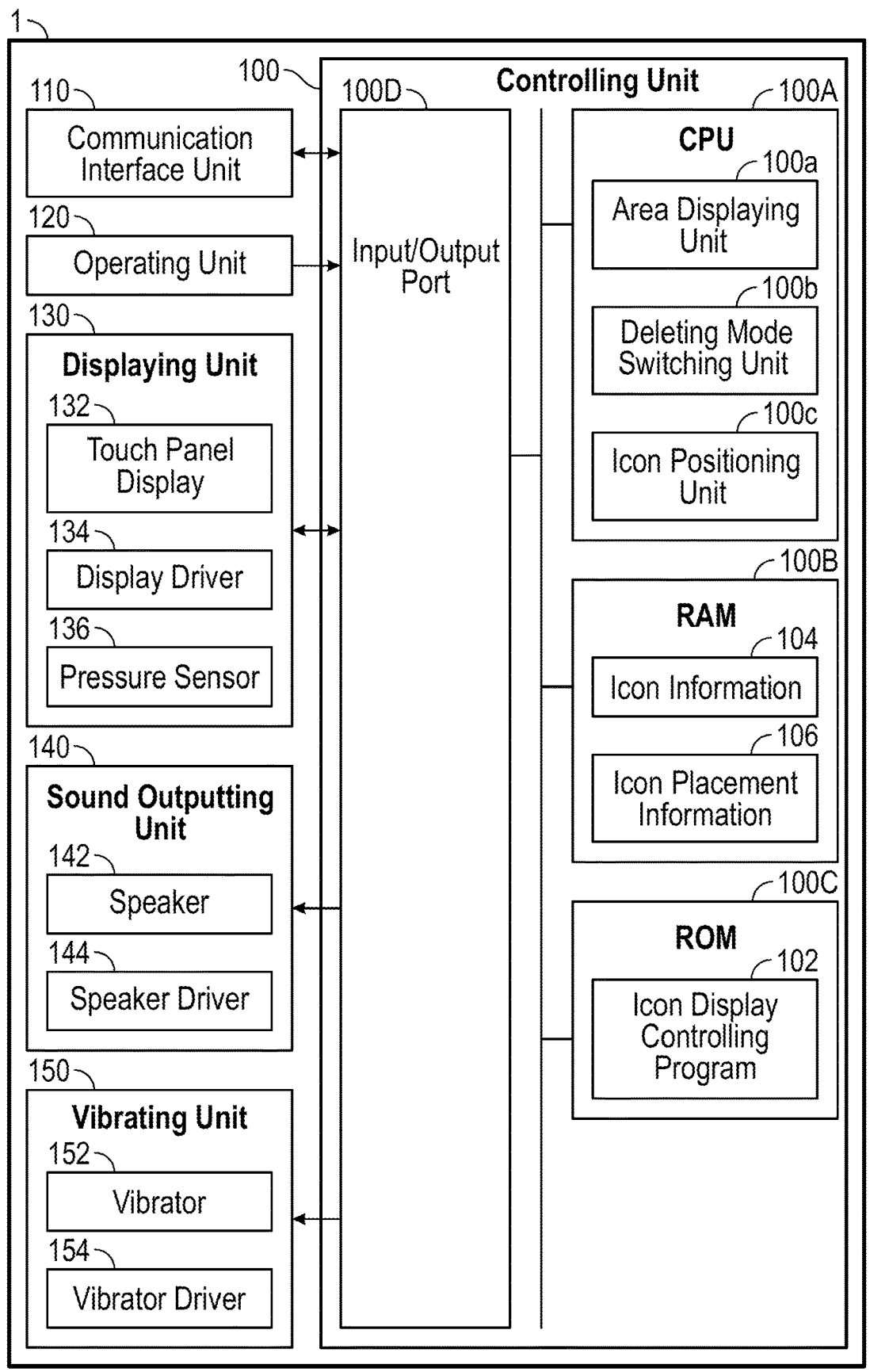
FIG. 1 is a block diagram showing the structure of an icon display controlling device according to one embodiment.

FIG. 1 is a block diagram showing the structure of an icon display controlling device 1 according to one embodiment. As showed in FIG. 1, the icon display controlling device 1 comprises a controlling unit 100 (e.g., a controller), a communication interface unit 110 (e.g., a communication interface), an operating unit 120, a displaying unit 130 (e.g., a display), a sound outputting unit 140 (e.g., a speaker assembly), and a vibrating unit 150 (e.g., a vibration assembly). Note that the main structural elements required for explaining the present embodiment are illustrated in FIG. 1. However, some structural elements may be omitted from the figure.

The controlling unit 100 is that which controls the icon display controlling device 1 as a whole, and is a microcomputer structured from a Central Processing Unit (CPU) 100A, a Random Access Memory (RAM) 100B, a Read Only Memory (ROM) 100C, an input/output port 100D, and bus lines for connecting these ports, and the like.

The CPU 100A reads in a program that is stored in the ROM 100C, to control the icon display controlling device 1 in accordance with the program that has been read in. The CPU 100A comprises, as functional blocks, an area displaying unit 100a, a deleting mode switching unit 100b, and an icon positioning unit 100c.

The CPU 100A, which is an example of a processor, may be, for example, a single processor or multiple processors, and includes at least one processor. When structured including a plurality of processors, the processor 10 may be packaged as a single device, or may be structured as a plurality of physically separated devices within a single icon display controlling device 1.

The RAM 100B is a storing unit for temporarily storing programs and data, and provides a work area. The RAM 100B may be, for example, a Dynamic Random Access Memory (DRAM).

Icon information 104 and icon placement information 106 are stored in the RAM 100B. The icon information 104 includes images, sizes, and shapes of icons, launch information for corresponding content (for example, music player applications, radio player applications, map applications, and the like), and so forth.

The ROM 100C is a non-volatile memory for storing various types of programs and data, including an icon display controlling program 102. The ROM 100C may be, for example, a flash memory. The music player application, radio player application, and map application, listed above by way of illustration, are stored in the ROM 100C.

The icon display controlling program 102 that is stored in the ROM 100C causes execution, on the CPU 100A, which is a computer, of: an area displaying step for displaying a first display area in which an icon may be placed; a deleting mode switching step for switching to a deleting mode wherein it is possible to delete a second icon that has already been placed in the first display area, upon performance of a predetermined operation for placing a first icon in the first display area; and an icon placing step for placing the first icon in the first display area upon deletion of the second icon in the deleting mode. The ease of operations when deleting an icon that is displayed in the display area and placing another icon can be improved through executing the icon display controlling program 102. The details of the icon display controlling program 102 will be described below.

In the present embodiment, each functional block of the CPU 100A is achieved by the icon display controlling program 102, which is software. Note that each functional block of the CPU 100A may be achieved, in whole or in part, by hardware, such as a dedicated logic circuit, instead.

The input/output port 100D connects the controlling unit 100 to other structural elements (specifically, a communication interface unit 110, an operating unit 120, a displaying unit 130, a sound outputting unit 140, and a vibrating unit 150).

The communication interface unit 110 is an interface that handles the process of communicating with another terminal device. The icon display controlling device 1 is connected communicatively to another terminal device through a public circuit or a communication circuit that is a closed network such as a Virtual Private Network (VPN), through the communication interface unit 110.

The operating unit 120 (e.g., a user interface, one or more input devices, etc.) is operating members for the user to operate the icon display controlling device 1, such as buttons, switches, or the like.

The displaying unit 130 has a touch panel display 132 and a display driver 134 for driving the touch panel display 132. The touch panel display 132 is structured so as to enable touch operations on the entire screen area. Note that "touch panel display" may refer simply to a "touch panel," or may refer to a "touch screen."

The touch panel display 132 is structured using, for example, an Liquid Crystal Display (LCD) or organic Electro Luminescence (EL) display. A resistance film system, electrostatic capacitance system, ultrasonic surface acoustic wave system, infrared radiation optical imaging system, electromagnetic induction system, or the like, may be used in the touch panel display 132. A pressure sensor 136 for detecting the pressure of a touch on the screen (in other words, a region wherein a touch operation can be performed) is built into the touch panel display 132.

The sound outputting unit 140 has a speaker 142 and a speaker driver 144 for driving the speaker 142. Music or voice that is stored in, for example, the ROM 100C or a storage medium that is not shown (a Hard Disk Drive (HDD), a Solid State Drive (SSD), a removable memory card, or the like) is outputted from the speaker 142 through driving of the speaker 142 by the speaker driver 144.

The vibrating unit 150 has a vibrator 152 and a vibrator driver 154 for driving the vibrator 152. The vibrator 152 may be structured using, for example, an Eccentric Rotating Mass (ERM), a Linear Resonant Actuator (LRA), a piezo element, or the like. The screen of the touch panel display 132 is vibrated through driving of the vibrator 152 by the vibrator driver 154.

Figure 2A:
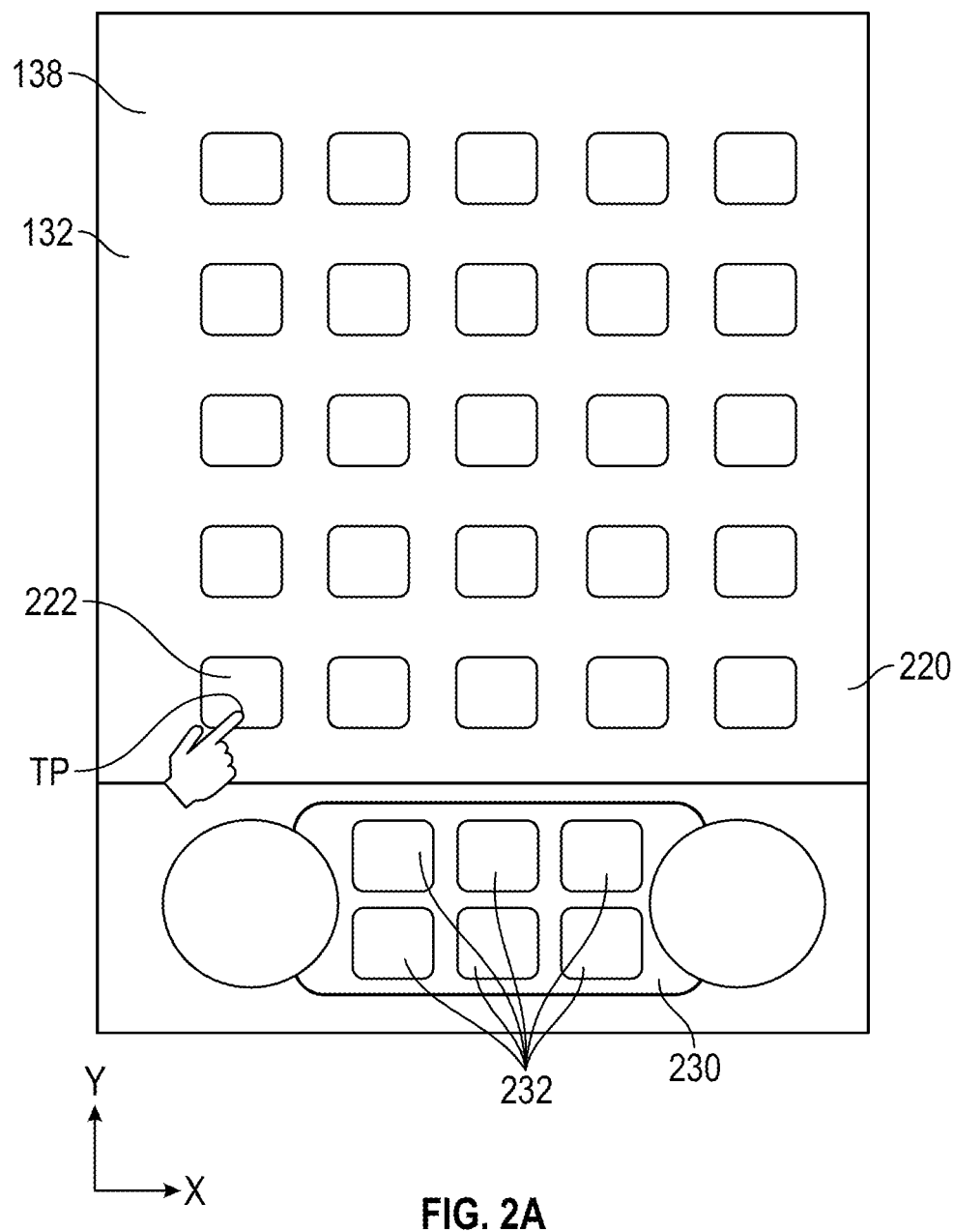
FIG. 2A is a diagram showing an example of an image that is displayed on the screen of a touch panel display in one embodiment.
Figure 2B:
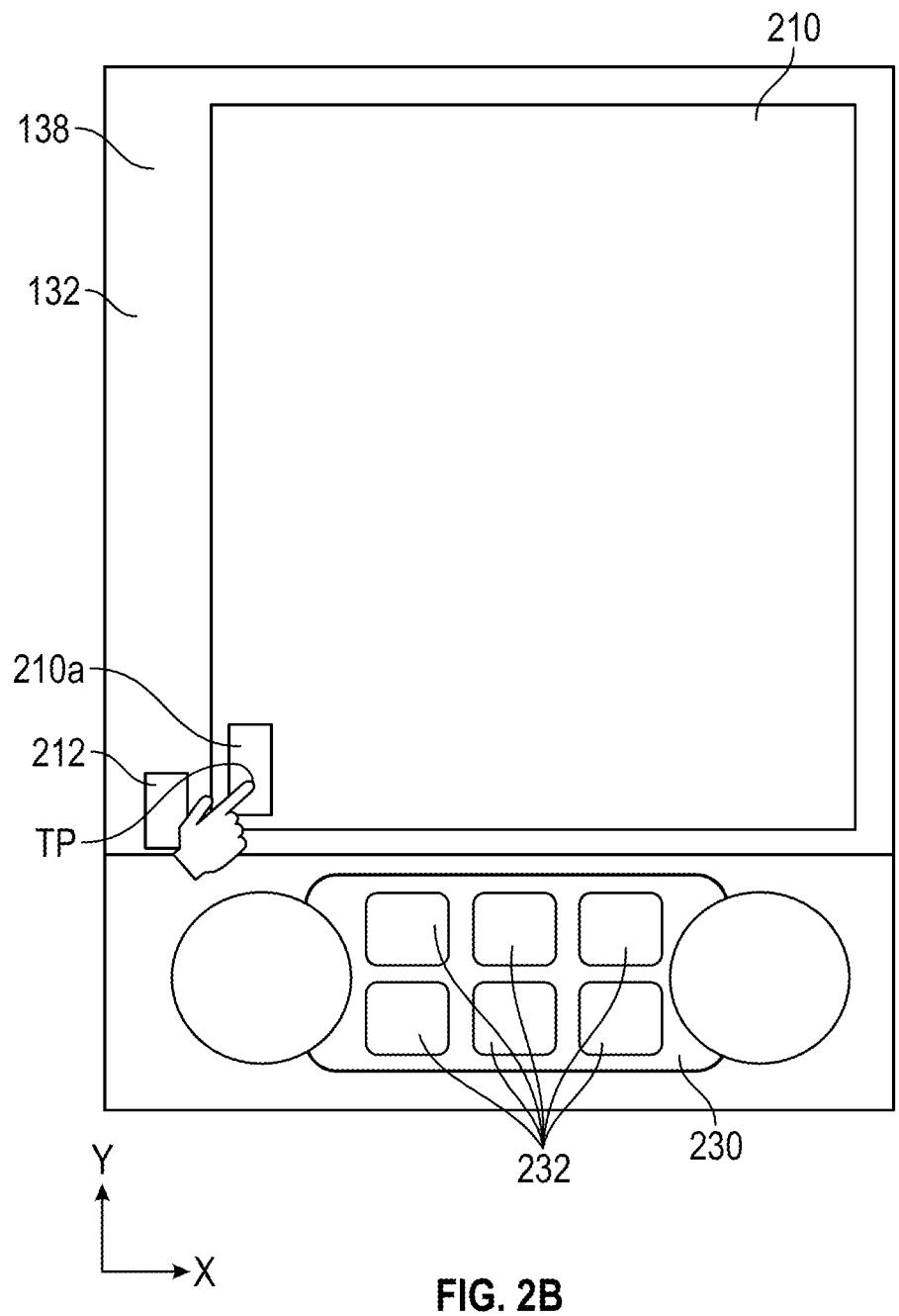
FIG. 2B is a diagram showing an example of an image that is displayed on the screen of a touch panel display in one embodiment.

FIG. 2A and FIG. 2B are diagrams showing examples of images that are displayed on the screen 138 of the touch panel display 132. Note that in FIG. 2A and FIG. 2B an icon of a hand that indicates the state where the user has touched the screen 138 is shown. The position of the fingertip of this icon is the user touch position TP on the screen 138. The user touch position TP on the screen 138 is acquired as X and Y two-dimensional coordinate information. The crosswise direction of the screen 138 corresponds to the X direction, and the vertical direction of the screen 138 corresponds to the Y direction.

As showed in FIG. 2A, a Graphical User Interface (GUI) screen that includes the icon display area 220 and a fixed icon display area at 230 is displayed on the screen 138.

Icons corresponding to various content are displayed in the icon display area 220 and the fixed icon display area 230. The user can cause the CPU 100A to execute the content that corresponds to an icon by touching that icon in the icon display area 220 or the fixed icon display area 230. For convenience, reference symbol 222 will be assigned to an icon that is placed in the icon display area 220, and reference symbol 232 will be assigned to an icon that is placed in the fixed icon display area 230.

When the user touches an icon 222 or 232, execution of the content corresponding to the touched icon is started, and also, as showed in FIG. 2B, a window 210 is displayed superimposed in front of the icon display area 220. An image for the content corresponding to the icon that was touched (for example, a music player application, a radio player application, a map application, or the like) is displayed in the window 210. By way of illustration, the jacket image, track name, artist name, playback position, and the like, for the music that is being played is displayed in the window 210 of a music player application. The broadcasting station, program name, broadcast frequency, and the like, is displayed in a radio player application.

A button 212 is displayed to the side of the window 210. When the button 212 is touched by a user, the window 210 is closed, and the screen 138 returns to the screen showed in FIG. 2A. The user may instead return the screen 138 to the screen showed in FIG. 2A through performing a swiping operation on the window 210.

The icons 222 and 232 are of a display size that is smaller than the window 210. Because of this, the amount of information that can be displayed by the icons 222 and 232 is more limited than that of the window 210. For example, with the icon 222 or 232 for the music player application, only an icon image that indicates that it is the application is displayed.

The icon display controlling program 102 controls the display size and shape of each individual icon 222 and 232 within the icon display area 220 and the fixed icon display area 230 depending on the display size and shape information included in the icon information 104. The icon display controlling program 102 controls the placement of each icon 222 and 232 in the icon display area 220 and fixed icon display area 230 through icon placement information 106.

As showed in FIG. 2B, when the window 210 is displayed, icons 222 that are placed in the icon display area 220 will no longer be visible. That is, the icons 222 cannot always be seen.

In contrast, an icon 232 that is displayed in the fixed icon display area 230 can always be seen. Because of this, typically the user places, in the fixed icon display area 230, icons 232 that correspond to content that is used frequently.

By way of illustration, a maximum of six icons 232 can be placed in the fixed icon display area 230. Note that the number of icons 232 that can be placed in the fixed icon display area 230 is not limited thereto. In another embodiment, the number of icons 232 that can be placed in the fixed icon display area 230 may instead be 5 or less, or may instead be 7 or more.

The number of icons 232 that can be placed in the fixed icon display area 230 is limited. When, in the conventional structure, an icon 232 is to be replaced, for example, the user is forced to complete complex operations such as an operation to switch to a deleting mode, an operation to delete the icon, an operation to switch to a registering mode, an operation to register a new icon, and the like. Performing such complex operations is difficult when the user is in a situation wherein there is limited opportunity to look at the screen 138 (for example, when a driver is in a car).

Given this, in the present embodiment the execution of the icon display controlling program 102 by the CPU 100A enables the user to change the placement of an icon 232 in the fixed icon display area 230 (for example, replacing an icon 232) through a simpler operation.

Figure 3:
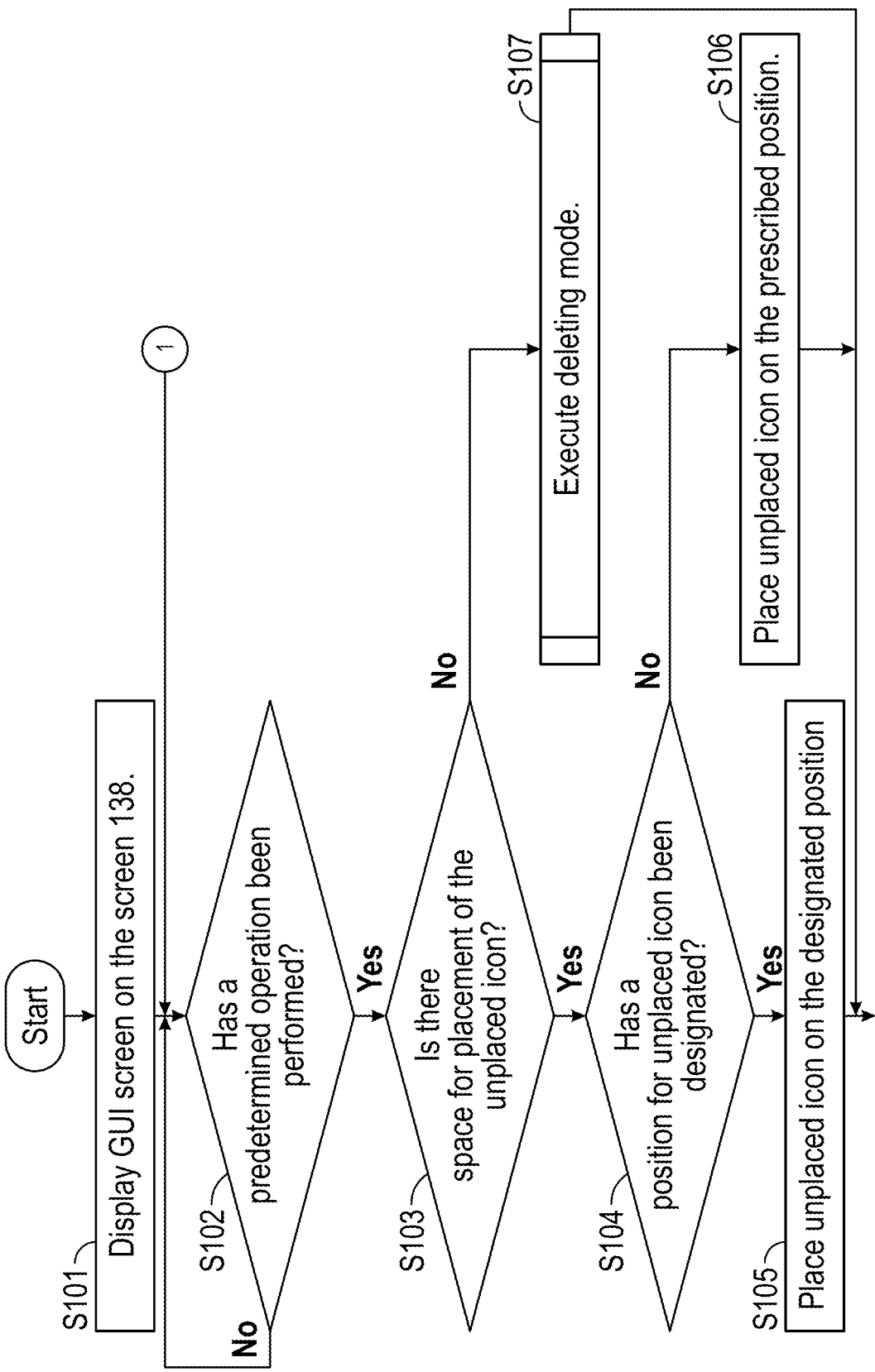
FIG. 3 is a flowchart showing the process of the icon display controlling program that is executed by a CPU in one embodiment.

FIG. 3 is a flowchart showing the processes of the icon display controlling program 102 that is executed by the CPU 100A in one embodiment. Execution of the processes in the flowcharts shown in FIG. 3 commences upon startup of the system of the icon display controlling device 1, for example. The processes in the flowchart shown in FIG. 3 are terminated when the system of the icon display controlling device 1 is shut down.

When the system of the icon display controlling device 1 is started, the icon display controlling program 102 displays a GUI screen, of which an example is given in FIG. 2A, on the screen 138 (Step S101). In this way, in Step S101 the icon display controlling program 102 operates as an area displaying unit 100a for displaying a fixed icon display area 230 (a first display area), wherein an icon can be placed.

The icon display controlling program 102 determines whether or not a predetermined operation has been performed for placing a first icon (that is, an icon that does not currently exist in the fixed icon display area 230, hereinafter termed an "unplaced icon") into the fixed icon display area 230 (Step S102).

For example, upon detection by the pressure sensor 136 that an unplaced icon that is one of the icons 222 placed in the icon display area 220 has been touched with a pressure of no less than (e.g., greater than or equal to) a predetermined threshold value, the icon display controlling program 102 switches to a mode that enables a drag-and-drop operation on the unplaced icon. The "predetermined operation" referenced above is an operation for dragging and dropping an unplaced icon into the fixed icon display area 230 in this mode. When the touch on the screen 138 is released (for example, when the user removes the finger from the screen 138), this mode is terminated.

The "predetermined operation" referenced above may instead be an operation for touching a bookmark button 210a of the window 210 that displays content corresponding to an unplaced icon.

When the predetermined operation, referenced above, is performed (Step S102: YES), the icon display controlling program 102 determines whether or not there is space in the fixed icon display area 230 to enable placement of the unplaced icon that is to be placed (Step S103).

If the fixed icon display area 230 has space for placement of the unplaced icon (Step S103: YES), the icon display controlling program 102 determines whether or not a position for the unplaced icon in the fixed icon display area 230 has been designated (Step S104).

If the position for the unplaced icon in the fixed icon display area 230 has been designated (Step S104: YES), the icon display controlling program 102 places the unplaced icon onto the designated position (Step S105).

For example, the "designated position," referenced above, may be the drop position (that is, the position wherein the user has removed the finger from the screen 138) within the fixed icon display area 230 of the unplaced icon that has been dragged from the icon display area 220.

If the position for the unplaced icon in the fixed icon display area 230 has not been designated (Step S104: NO), the icon display controlling program 102 places the unplaced icon on a predetermined position within the fixed icon display area 230 (Step S106).

For example, if a bookmark button 210a is touched, the icon display controlling program 102 determines that the position of the unplaced icon has not been designated.

The "predetermined position" referenced above may be, for example, the position of the vacant space that is nearest to the first position. Taking FIG. 2A as an example, the position in the top row, furthest to the negative side in the X-direction in the fixed icon display area 230 would be the first position. The further a position in the top row of the fixed icon display area 230 is toward the positive side in the X-direction from the first position, the further the position is from the first position. Moreover, a position in the bottom row of the fixed icon display area 230 that is furthest toward the negative side in the X-direction (the bottom row first position) is a position that is further from the first position than any position on the top row. For a position in the bottom row of the fixed icon display area 230, the further that position is toward the positive side in the X-direction from the bottom row first position, the further the position is from the bottom row first position, and also from the first position.

After the processes in Step S105 and S106, the icon display controlling program 102 returns to the process of Step S102, to await inputting of a predetermined operation.

If there is no space for placement of the unplaced icon in the fixed icon display area 230 (Step S103: NO), the icon display controlling program 102 switches to a deleting mode that enables deletion of an icon 232, and executes the deleting mode (Step S107).

In this way, in Step S107, a predetermined operation for placing the unplaced icon (e.g., the first icon) into the fixed icon display area 230 (e.g., the first display area)

is performed, the icon display controlling program 102 operates as a deleting mode switching unit 100b for switching to a deleting mode that enables deletion of an icon 232 (e.g., a second icon) that has already been placed in the fixed icon display area 230. More specifically, the icon display controlling program 102 that operates as the deleting mode switching unit 100b switches to the deleting mode if, when the predetermined operation referenced above is performed, there is no space for placing the unplaced icon in the fixed icon display area 230.

The icon display controlling program 102 may cause a sound that indicates switching to the deleting mode to be outputted from the speaker 142. Additionally, the icon display controlling program 102 may drive the vibrator 152 to vibrate the screen 138 in a predetermined pattern to notify the user that the mode has been switched to the deleting mode.

The icon display controlling program 102 may also display, on the screen 138, an image (such as a garbage can mark) for notifying the user that the mode has switched to the deleting mode. Moreover, when switching to the deleting mode, the icon display controlling program 102 may display on the screen 138, or cause outputting from the speaker 142 as voice guidance, a message stating, for example, "Please touch the icon to delete."

Figure 4:
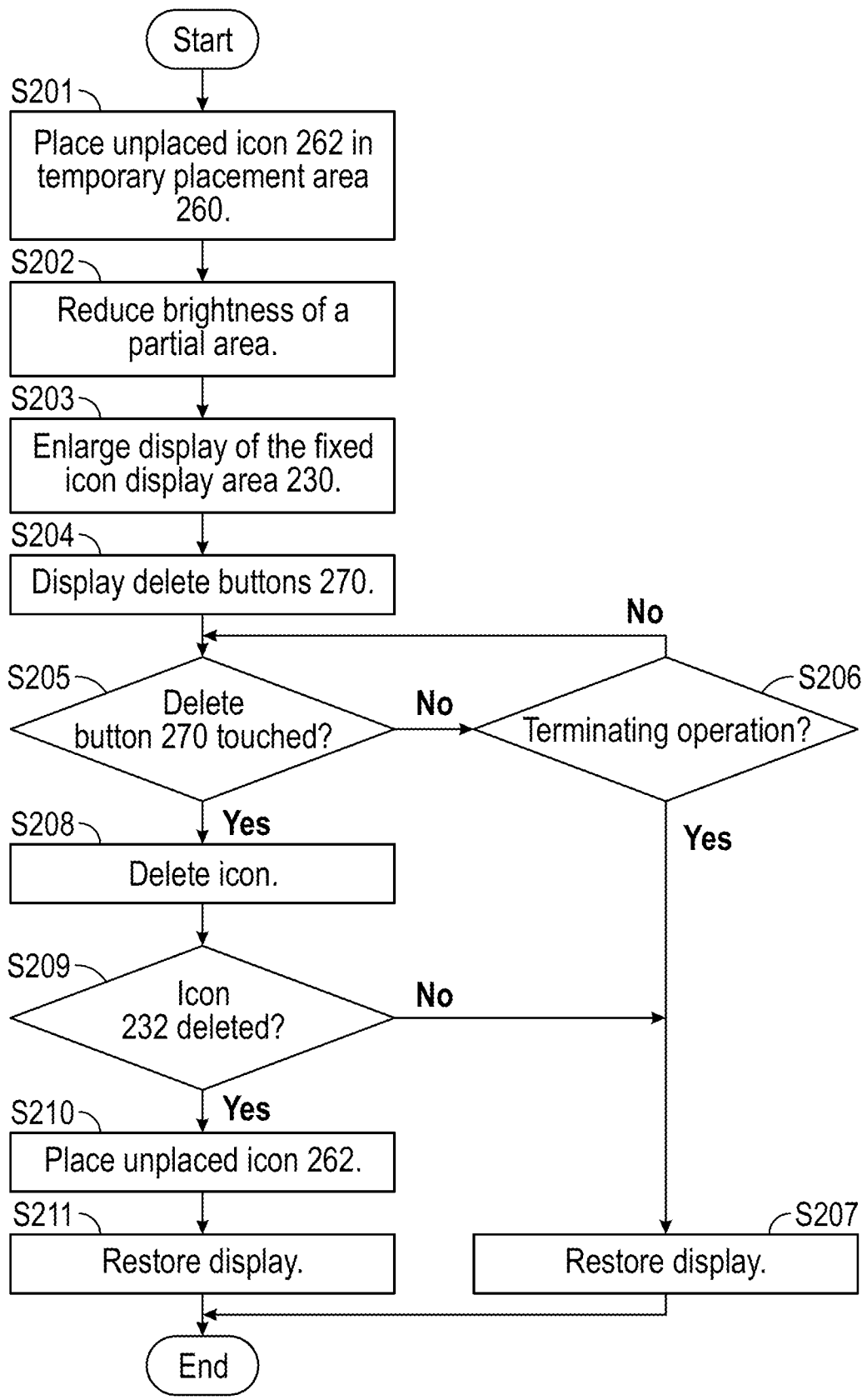
FIG. 4 is a diagram showing the subroutine of Step S107 in FIG. 3.
Figure 5:
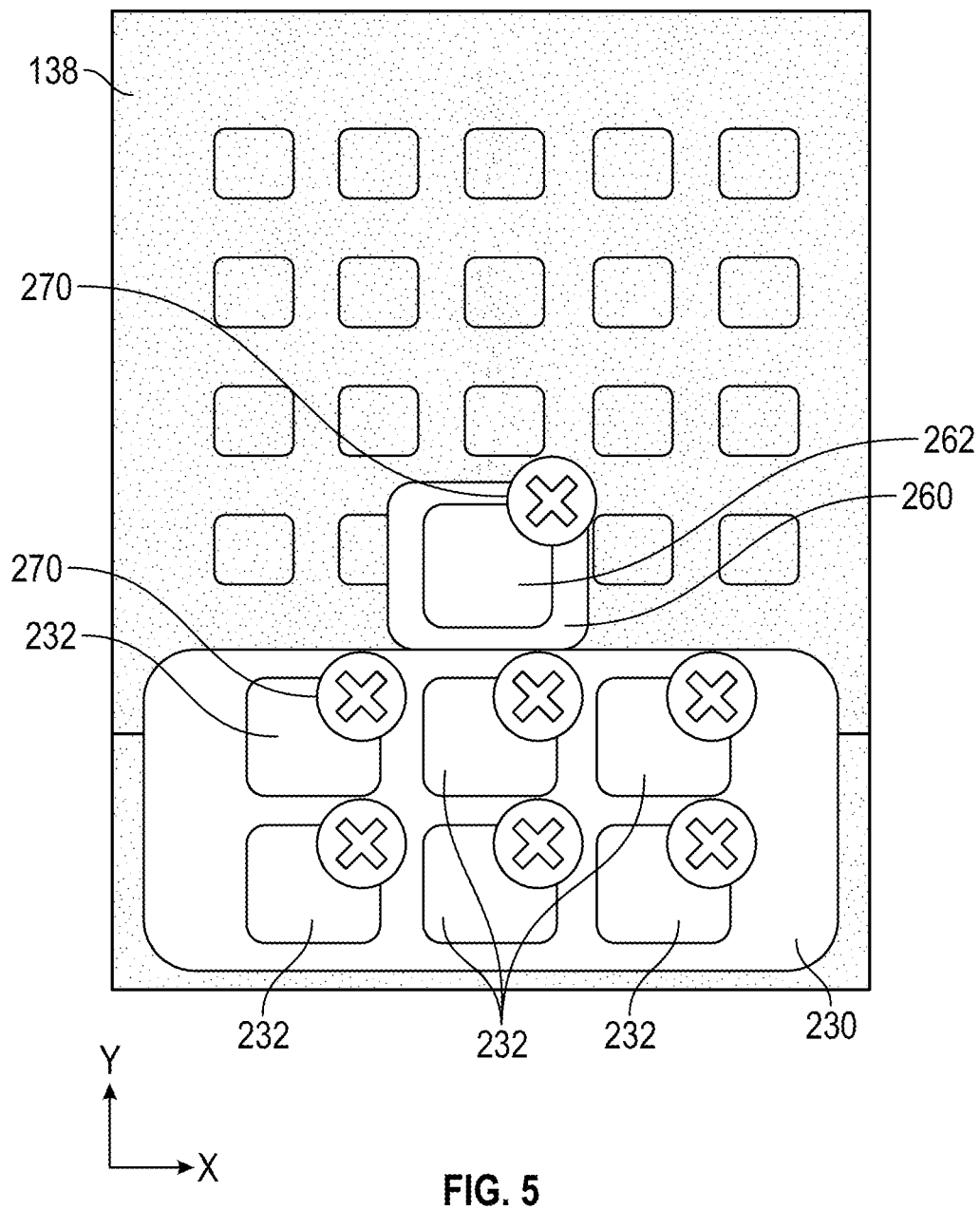
FIG. 5 is a diagram showing an example of an image that is displayed on the screen when in the deleting mode in one embodiment.

FIG. 4 is a diagram showing a subroutine in Step S107 of FIG. 3. FIG. 5 is a diagram showing an example of an image that is displayed on the screen 138 when in deleting mode.

As showed in FIG. 4, the icon display controlling program 102 displays a temporary placement area 260 at a position that is adjacent to the fixed icon display area 230, and places, into the displayed temporary placement area 260, the unplaced icon that is to be placed (Step S201). As described below, an unplaced icon that is placed in the temporary placement area 260 is assigned reference symbol 262.

In the present embodiment, in the deleting mode not just icons 232, but the unplaced icon 262 is also set as deletion object. The temporary placement area 260 is displayed in a position adjacent to the fixed icon display area 230, and the unplaced icon 262 is placed in the temporary placement area 260, to enable all of the icons that are deletion object to be visible to the user.

While in FIG. 5 the temporary placement area 260 is displayed in the center above the fixed icon display area 230, the position for displaying the temporary placement area 260 is not limited thereto. Instead, the temporary placement area 260 may be placed adjacent to the fixed icon display area 230 at a different position from that in FIG. 5, such as at the center below the fixed icon display area 230. Conversely, the temporary placement area 260 may instead be placed at a position that is not adjacent to the fixed icon display area 230.

The user may set only the icons 232 to be deletion object. In this case, the icon display controlling program 102, when in the deleting mode, would not need to display the temporary placement area 260 and the unplaced icon 262 on the screen 138. That is, the icon display controlling program 102 may skip the process in Step S201.

The icon display controlling program 102 displays, at a brightness that is lower than that of the fixed icon display area 230 and the temporary placement area 260, the area in the screen 138 that is other than that of the fixed icon display area 230 and the temporary placement area 260 (Step S202).

By way of illustration, the icon display controlling program 102 displays the fixed icon display area 230 at the same brightness, without changing, from before switching to the deleting mode, and displays the temporary placement area 260 with the same brightness as that of the fixed icon display area 230, but reduces the brightness of the areas other than those of the fixed icon display area 230 and the temporary placement area 260 when compared with the brightness thereof prior to switching to the deleting mode. Through this, the brightness of the areas other than those of the fixed icon display area 230 and the temporary placement area 260 will be less than that of the fixed icon display area 230 and the temporary placement area 260.

Because of this, in the screen 138, the fixed icon display area 230 and the temporary placement area 260 are displayed brightly, the user can easily identify the icons 232 in the fixed icon display area 230 and the unplaced icon 262 in the temporary placement area 260.

The icon display controlling program 102 displays the fixed icon display area 230 enlarged when compared to prior to switching to the deleting mode (Step S203).

Enlarging the display of the fixed icon display area 230 will cause the display size of the icons 232 to be larger, and the spacing between the icons 232 to be wider. This reduces the likelihood of an erroneous operation of touching an icon 232 that is not the icon 232 that the user wishes to delete in the deleting mode.

The icon display controlling program 102 displays delete buttons 270 superimposed on the icons 232 within the fixed icon display area 230 and on the unplaced icon 262 in the temporary placement area 260 (Step S204). An image such as illustrated in FIG. 5 will be displayed on the screen 138 thereby. Delete buttons 270 that are displayed superimposed on each of the icons 232 and the unplaced icon 262 correspond to those icons. By touching a delete button 270, the user is able to delete the icon 232 or unplaced icon 262 that corresponds to the delete button 270 that is touched.

A determination is performed as to whether or not the user has touched a delete button 270 (Step S205). If no delete button 270 has been touched (Step S205: NO), the icon display controlling program 102 determines whether or not an operation to terminate the deleting mode has been performed (Step S206). This terminating operation may be an operation that is a long push on a low-brightness area other than the fixed icon display area 230 and the temporary placement area 260, or a heavy touch operation on a low-brightness area.

When the operation for terminating the deleting mode has been performed (Step S206: YES), the icon display controlling program 102 returns the screen 138 to the display from immediately prior to switching to the deleting mode (Step S207), terminating the deleting mode. The icon display controlling program 102 returns to the process of Step S102, and awaits inputting of a predetermined operation. In this case, the deleting mode is terminated without having deleted any icon 232. This can be stated differently as the deleting mode being terminated after having deleted the unplaced icon 262 of the temporary placement area 260.

When a delete button 270 is touched (Step S205: YES), the icon display controlling program 102 deletes the icon 232 or the unplaced icon 262 that corresponds to the delete button 270 that has been touched (Step S208).

When an icon 232 has been deleted (Step S209: YES), the icon display controlling program 102 places the unplaced icon 262 into the space within the fixed icon display area 230 that has been vacated by the deletion of the icon 232 (Step S210). The icon display controlling program 102 returns the screen 138 to the display from immediately prior to switching to the deleting mode (albeit a display after the unplaced icon 262 has been placed into the fixed icon display area 230) (Step S211), and terminates the deleting mode. The icon display controlling program 102 returns to the process of Step S102, to await inputting of a predetermined operation.

Figure 6A:
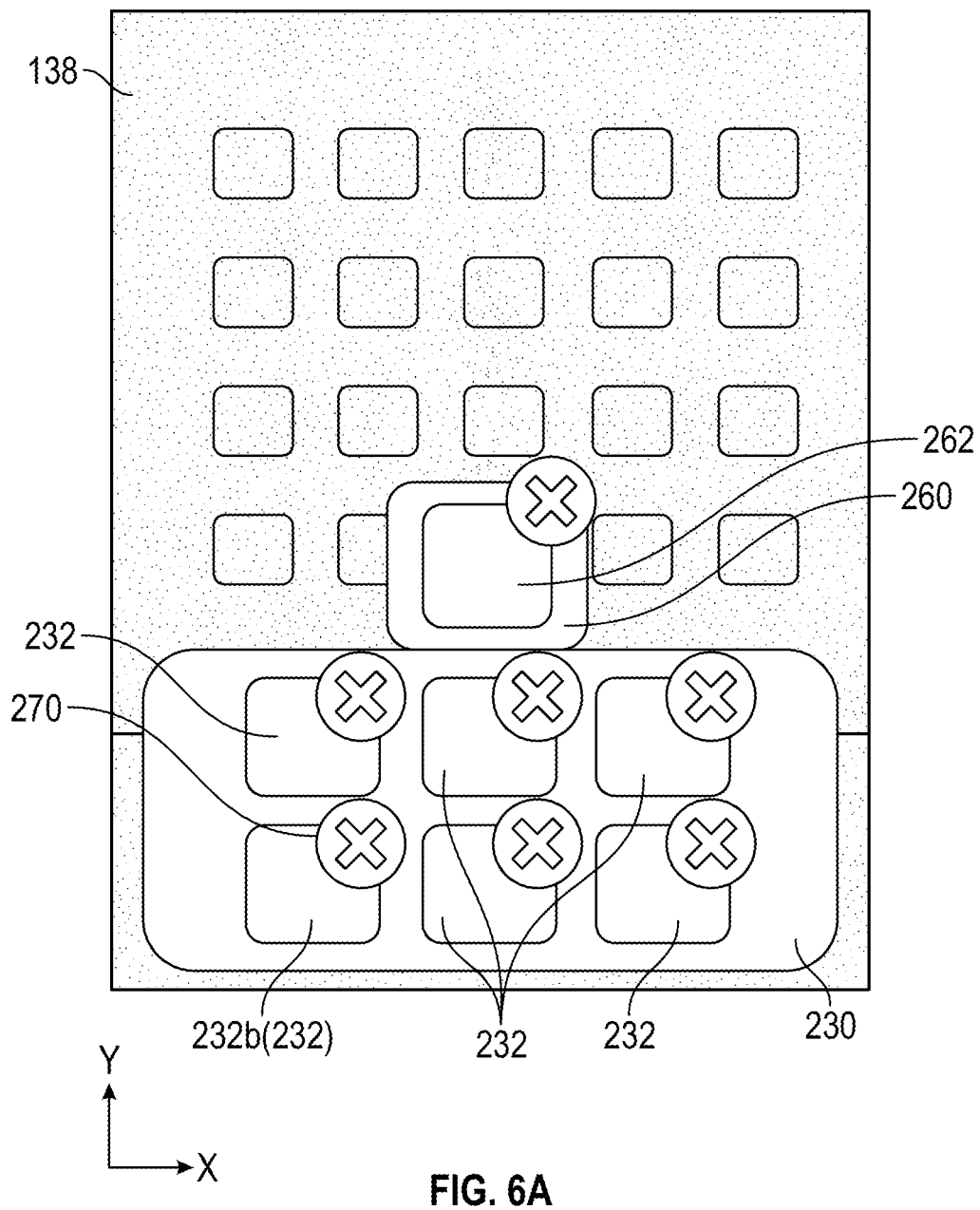
FIG. 6A is a diagram showing an example of processes in Steps S208 through S211 of FIG. 4.
Figure 6B:
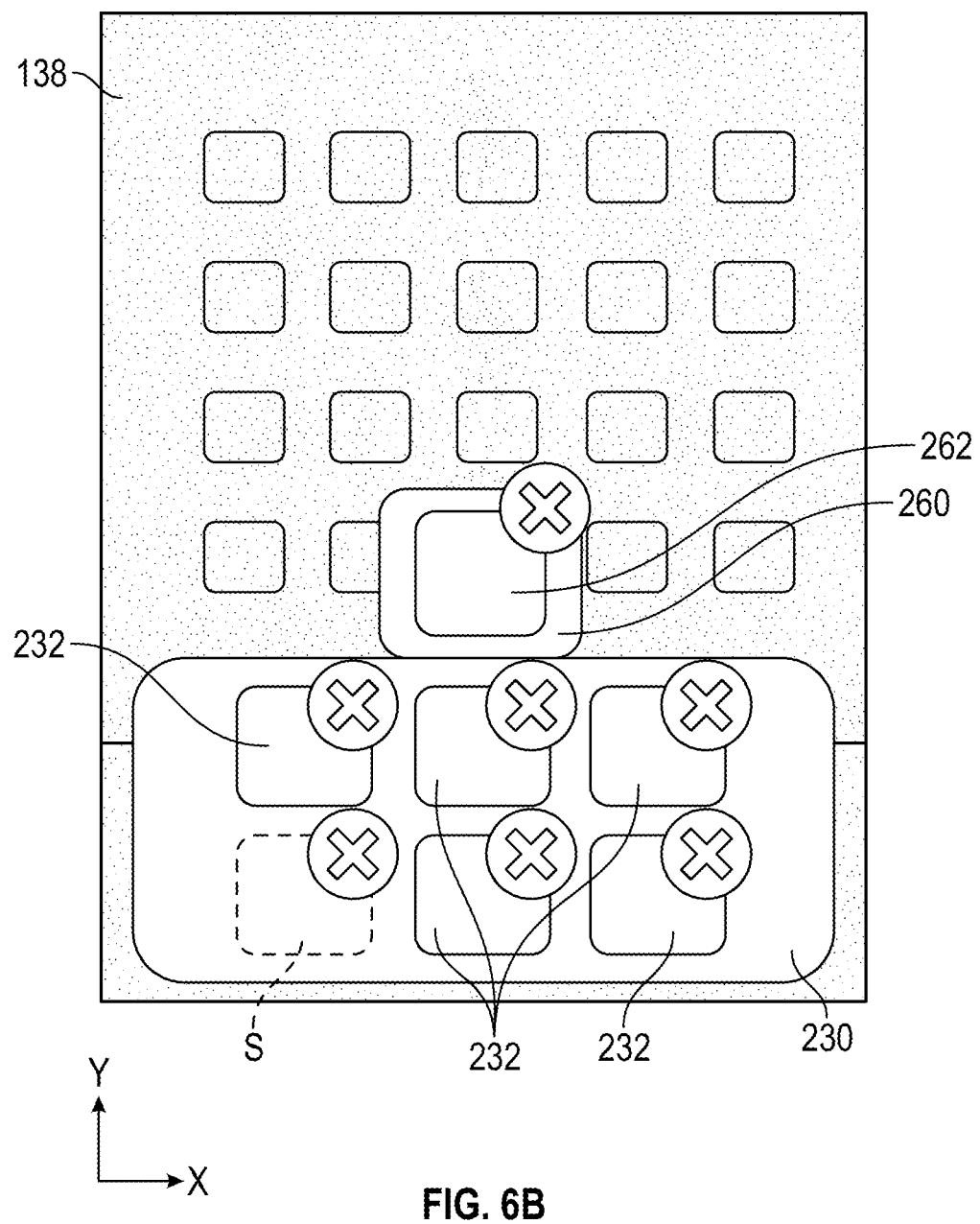
FIG. 6B is a diagram showing an example of processes in Steps S208 through S211 of FIG. 4.
Figure 6C:
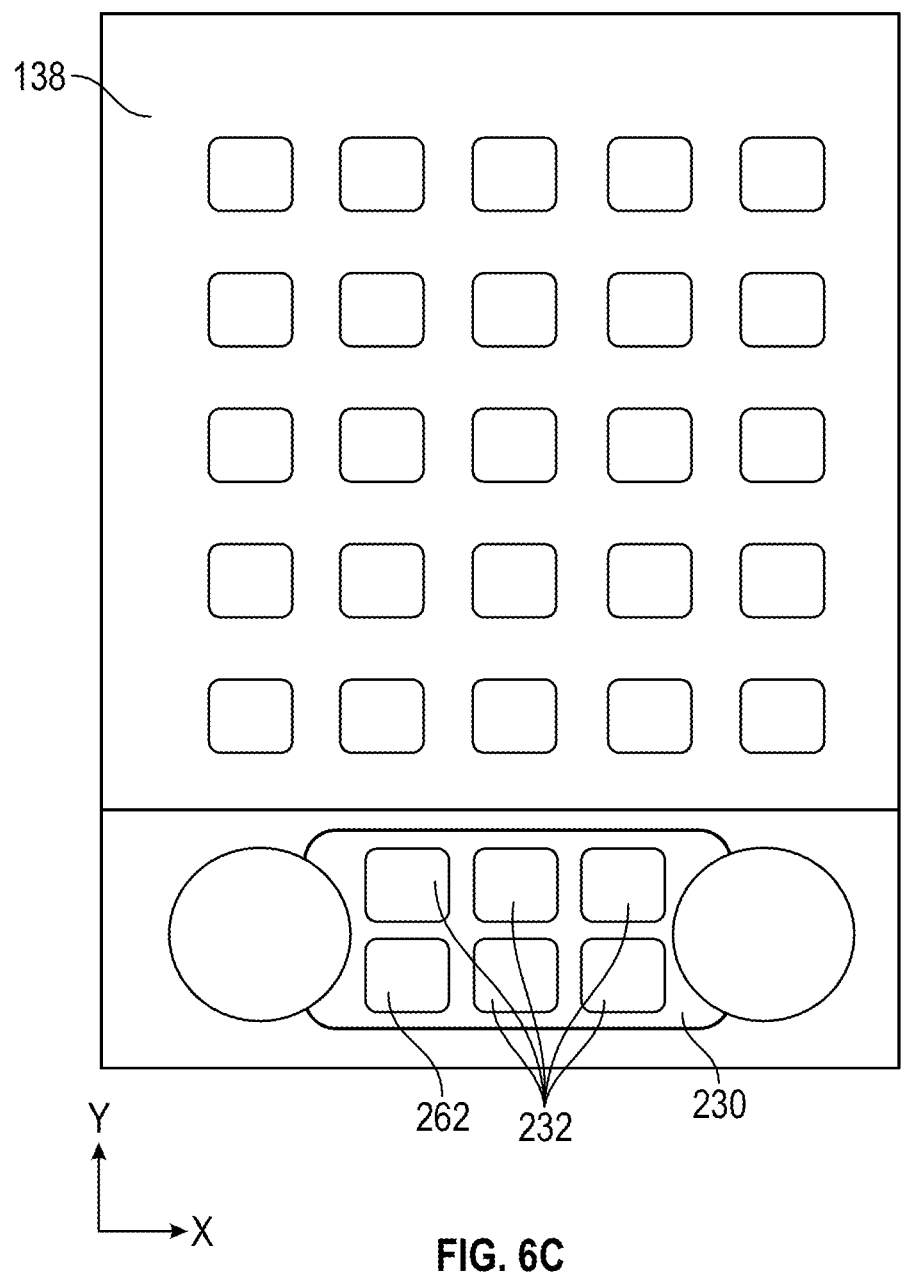
FIG. 6C is a diagram showing an example of processes in Steps S208 through S211 of FIG. 4.

FIG. 6A through FIG. 6C show examples of the processes in Steps S208 through S211. In the example in FIG. 6A, the icon 232 that is to be deleted is assigned reference symbol 232b. Moreover, the space vacated by the deletion of the icon 232b is assigned reference symbol S.

When the delete button 270 that corresponds to the icon 232b that is showed in FIG. 6A is touched, the icon display controlling program 102 deletes the icon 232b (Step S208 and Step S209: YES). As showed in FIG. 6C, the icon display controlling program 102 places the unplaced icon 262 in the space S that is vacated by the deletion of the icon 232b (referencing FIG. 6B) (Step S210), and returns the screen 138 to the display from immediately prior to switching to the deleting mode (Step S211).

Note that the position of the unplaced icon 262 within the fixed icon display area 230 is not limited to the position described above. In another embodiment, the icon display controlling program 102 may move the icons 232 that are after the space (the icons 232 that are at positions that are further from the first position) toward the first position side, so as to pack into the space that was vacated by the deletion of the icon 232, and then place the unplaced icon 262 in the place that is at the end, which was vacated by moving the other icons 232.

If the unplaced icon 262 has been deleted (Step S209: NO), the icon display controlling program 102 returns the screen 138 to the display from immediately prior to switching into the deleting mode (Step S207), terminating the deleting mode, and returns to the process of Step S102, to await inputting of a predetermined operation.

Through this, in Step S107 the icon display controlling program 102, in the period between the switch into the deleting mode and the deletion of the icon 232 (e.g., the second icon), places the unplaced icon 262 (e.g., the first icon) into a temporary placement area 260 (e.g., a second display area) that is other than the fixed icon display area 230 (e.g., the first display area).

Moreover, in Step S107, while in the deleting mode the icon display controlling program 102 displays, with a brightness that is less than that of the fixed icon display area 230 and the temporary placement area 260, the areas other than the fixed icon display area 230 (e.g., the first display area) and the temporary placement area 260 (e.g., the second placement area) in the screen 138.

Moreover, in Step S107, while in the deleting mode, the icon display controlling program 102 enlarges, when compared to prior to switching to the deleting mode, the display of the fixed icon display area 230 (e.g., the first display area) wherein the icons 232 (e.g., second icons) are placed.

Additionally, in Step S107, the icon display controlling program 102 operates as an icon positioning unit 100c for positioning the unplaced icon 262 (e.g., the first icon) in the fixed icon display area 230 (e.g., the first display area) when the icon 232 (e.g., the second icon) is deleted in the deleting mode.

In this way, the present embodiment enables replacement of an icon 232 in the fixed icon display area 230 by merely the simple operation of selecting the icon 232 that is to be deleted, through performing a predetermined operation to place an unplaced icon 262 into the fixed icon display area 230. That is, this brings about an improvement in the ease of operations where performing such a replacement, when compared to the operations in a conventional icon display controlling device.

The above is an explanation of an exemplary embodiment. Embodiments of the present disclosure are not limited to that which was explained above, and a variety of modifications are possible within the scope of the technical concept and idea of the present disclosure. For example, details of arbitrary combinations of embodiments that are explicitly illustrated in the Specification, and embodiments that are obvious, and the like, are included in embodiments of the present application.

In the embodiments described above, the user can delete an icon 232 or the unplaced icon 262 by touching a delete button 270. The icon deletion operation is not limited thereto. The user may instead delete an icon 232 by performing a swiping operation or flicking operation on the icon 232 so as to flick the icon 232 out of the fixed icon display area 230. Conversely, the user may delete the icon 232 by double tapping the icon 232. For the unplaced icon 262 as well, the user may similarly delete it through performing a swiping operation, a flick operation, or a double-tap operation.

The icon 232 or unplaced icon 262 may be deleted through an operation on, for example, a button that is provided in an operating unit 120, instead of a touch operation on the screen 138.

The processing detail of the icon display controlling program 102, explained in the embodiments above, is no more than an example. For example, an icon display controlling program 102 that does not execute the processes in Step S202 and Step S203 would still fall within the present disclosure. That is, during the deleting mode, the icon display controlling program 102 need not necessarily display with reduced brightness the areas other than the fixed icon display area 230 and the temporary placement area 260, and need not necessarily enlarge the display of the fixed icon display area 230.

The icon display controlling program 102 may switch into an editing mode when there is a long push on an arbitrary position of the screen 138 while awaiting an operation input in Step S102. When switching to the editing mode, the icon display controlling program 102 may enlarge the fixed icon display area 230, when compared to prior to switching to the editing mode, similarly to Step S203 of FIG. 4. The user can change the order of the icons 232 in the icon display area 230 through performing drag-and-drop operations on the icons 232 within the fixed icon display area 230.

EXPLANATION OF REFERENCE NUMERALS

1: Icon Display Controlling Device
100: Controlling Unit
100A: CPU
100B: RAM
100C: ROM
100D: Input/Output Port
100a: Area Displaying Unit
100b: Deleting Mode Switching Unit
100c: Icon Positioning Unit
102: Icon Display Controlling Program
110: Communication Interface Unit
120: Operating Unit
130: Displaying Unit
132: Touch Panel Display
134: Display Driver
136: Pressure Sensor
140: Sound Outputting Unit
142: Speaker
144: Speaker Driver 150: Vibrating Unit
152: Vibrator
154: Vibrator Driver

What is claimed is:

1. An icon display controlling device, comprising:
an area displaying unit that causes a display to display a first display area within which an icon can be placed;
a deleting mode switching unit that switches to a deleting mode that enables designation of a second icon that has already been placed in the first display area, in response to performance of a predetermined operation for placing a first icon in the first display area when there is no vacant space in the first display area, wherein the designation of the second icon causes the second icon to be deleted; and
an icon positioning unit that places the first icon in the first display area in a space that is vacated by deletion of the second icon that is designated in the deleting mode.

2. The icon display controlling device of claim 1, wherein:
the first icon is placed in a second display area outside of the first display area during an interval between switching to the deleting mode and deletion of the second icon.

3. The icon display controlling device of claim 2, wherein:
an area outside of the first display area and the second display area is displayed with a first brightness that is less than a second brightness of the first display area and the second display area in the deleting mode.

4. The icon display controlling device of claim 1, wherein:
in the deleting mode, the first display area is displayed enlarged relative to a size of the first display area prior to switching to the deleting mode.

5. The icon display controlling device of claim 1, wherein: the first icon can be deleted in the deleting mode.

6. The icon display controlling device of claim 1, wherein:
the deleting mode switching unit switches to the deleting mode in response to a determination that the first display area has insufficient space for placement of the first icon in the first display area when the predetermined operation is performed.

7. The icon display controlling device of claim 1, wherein the predetermined operation for placing the first icon in the first display area includes dragging and dropping the first icon into the first display area.

8. The icon display controlling device of claim 1, wherein, in response to the performance of the predetermined operation for placing the first icon in the first display area, the display displays a temporary placement area outside of the first display area, the temporary placement area containing the first icon.

9. The icon display controlling device of claim 8, wherein the designation of the second icon causes the display to stop displaying the temporary placement area.

10. The icon display controlling device of claim 1, wherein the space that is vacated by deletion of the second icon contains only the second icon when the second icon is deleted.

11. A non-transitory computer-readable medium including instructions stored thereon that, when executed by at least one processor, cause the at least one processor to perform operations comprising:
an area displaying step for displaying a first display area within which an icon can be placed;
a deleting mode switching step for switching to a deleting mode that enables designation of a second icon that has already been placed in the first display area, in response to performance of a predetermined operation for placing a first icon in the first display area when there is no vacant space in the first display area;
a deleting step for deleting the second icon in response to the designation of the second icon; and
an icon positioning step for placing the first icon in the first display area in a space that is vacated by deletion of the second icon that is designated in the deleting mode.

12. The non-transitory computer-readable medium of claim 11, wherein the predetermined operation for placing the first icon in the first display area includes dragging and dropping the first icon into the first display area.

13. The non-transitory computer-readable medium of claim 11, wherein a temporary placement area containing the first icon is displayed outside of the first display area while in the deleting mode.

14. The non-transitory computer-readable medium of claim 13, the operations further comprising a display modification step for stopping the display of the temporary placement area.

15. The non-transitory computer-readable medium of claim 14, wherein the display modification step is performed in response to the designation of the second icon.

16. The non-transitory computer-readable medium of claim 11, wherein the space that is vacated by deletion of the second icon contains only the second icon when the second icon is deleted.

17. An icon display controlling device, comprising:
an area displaying unit that causes a display to display a first display area within which an icon can be placed;
a deleting mode switching unit that switches to a deleting mode that enables deletion of a second icon that has already been placed in the first display area, in response to performance of a predetermined operation for placing a first icon in the first display area; and
an icon positioning unit that places the first icon in the first display area upon deletion of the second icon in the deleting mode,
wherein in the deleting mode, the first display area is displayed enlarged relative to a size of the first display area prior to switching to the deleting mode.

* * * * *